United States Patent [19]
Wheeler

[11] 3,878,868
[45] Apr. 22, 1975

[54] EXPANSION JOINT

[75] Inventor: Eric B. Wheeler, Duanesburg, N.Y.

[73] Assignee: General Electric Company, Schenectady, N.Y.

[22] Filed: Dec. 14, 1973

[21] Appl. No.: 424,808

[52] U.S. Cl. .................... 138/32; 138/28; 285/299; 285/300
[51] Int. Cl. ........................................ F16l 53/100
[58] Field of Search ............... 138/28, 32; 126/119; 92/34, 37, 42–44; 285/224–228, 298–301

[56] References Cited
UNITED STATES PATENTS

| | | | |
|---|---|---|---|
| 2,209,325 | 7/1940 | Dennis | 285/300 |
| 2,337,038 | 12/1943 | Fentress | 285/300 X |
| 2,406,234 | 8/1946 | Marancik et al. | 285/299 X |
| 3,241,868 | 3/1966 | Soderberg | 285/300 X |
| 3,488,949 | 1/1970 | Jackson | 60/39.32 |

FOREIGN PATENTS OR APPLICATIONS 825,464  12/1959  United Kingdom ............... 285/301

Primary Examiner—Donald E. Watkins
Assistant Examiner—James E. Bryant, III
Attorney, Agent, or Firm—John F. Ahern; James W. Mitchell

[57] ABSTRACT

An elongated expansion joint interconnecting a pair of pipe sections comprising a number of discrete bellows groups and a plurality of fixed and "floating" ring members. Radial limit stops on cylindrical liners affixed to selected ring members control axial deflection whereas the radial proximity of the liners to the surrounding bellows groups and ring members control lateral deflection.

9 Claims, 3 Drawing Figures

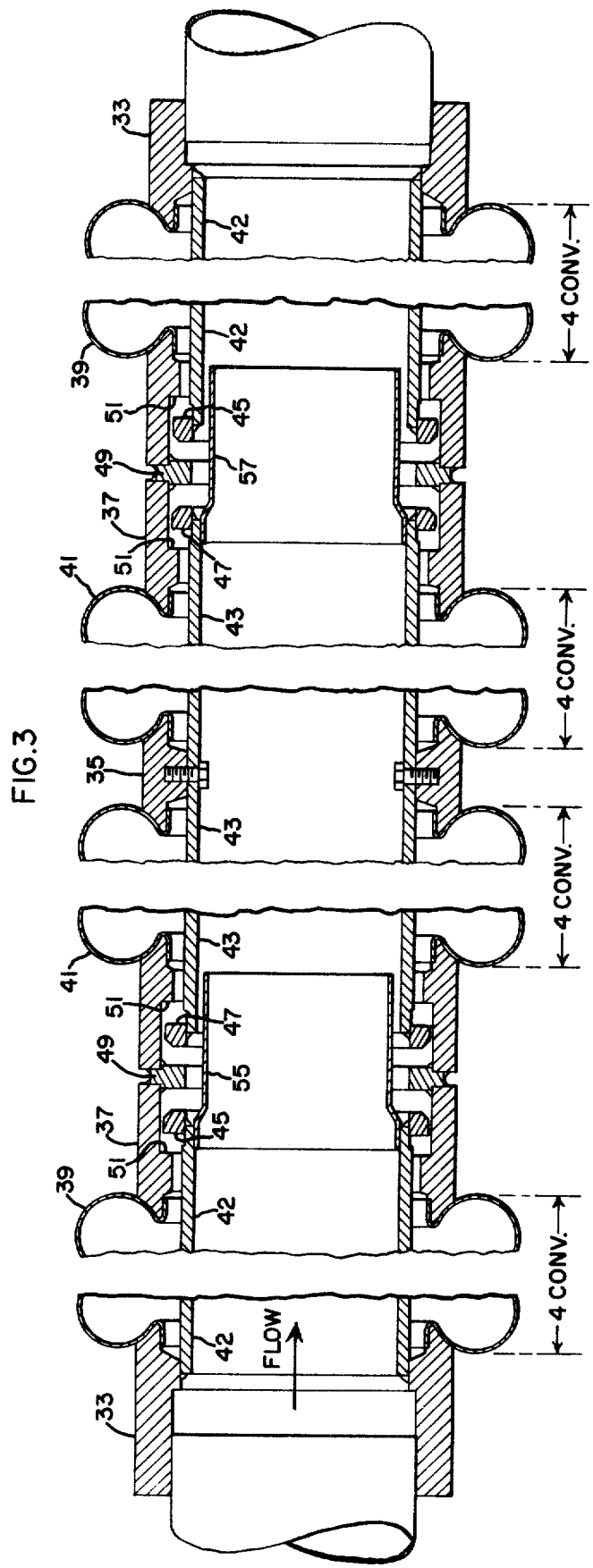

EXPANSION JOINT

BACKGROUND OF THE INVENTION

This invention generally relates to the art of bellows joints and especially to relatively large bellows joints used by power piping, chemical and process industries subject to thermal expansion.

Large steam turbines employ bellows expansion joints in crossover piping between turbine casings. New designs require the use of bellows with more convolutions than previously in order to absorb the larger thermal expansion encountered; as, for example, in crossover pipes on six-flow turbines. In order to limit operating stresses to an acceptable level, the number of bellows convolutions is nearly twice that currently designed. A simple extension of current design is known to lead to the following problems which are limiting on the number of convolutions.

1. Unequal deflection of convolutions giving increased operating service to some convolutions and early failure due to fatigue.

2. Gross distortion of convolution pitch, generally known as "squirm" under internal pressure loading. Squirm is known to be related to increasing pressure and number of convolutions.

Prior art solutions known to solve the problem of unequal deflection include: (a) So-called "self-equalizing" root rings installed in the root of each convolution limit the compressive deflection on each convolution. They do not limit the extension; (b) Limit stops on external guide rods connected to either root rings or each end of the bellows. They may be constructed to limit both overall extension and compression but still permit unequal deflection of convolutions; (c) "Pantograph" mechanisms connected to external root rings regulate the movement of each root ring and hence the convolution. They are expensive and unreliable for extended service.

Prior art solutions known to solve the problem of squirm distortion include: (a) Redesign to use external pressure loading. Externally loaded bellows are considerably more stable than internally loaded bellows; (b) Internal or external guide rods, cylinders or liners to limit the lateral freedom of the bellows convolutions. These liners are attached to one end of the bellows and behave as a rigid extension of the connecting pipe. There are a number of disadvantages associated with these methods for large numbers of convolutions. Solution (a) is costly and not applicable to all designs of convolution, especially that currently used in turbine crossovers and solutions; solution (b) tends to increase the probability of unequal convolution deflection because of the axial friction forces imposed.

Accordingly, it is one object of the present invention to provide a bellows expansion joint having an increased number of convolutions to absorb increased thermal expansion.

It is another object of the present invention to limit unequal deflection of bellows convolutions.

It is another object of the present invention to prevent squirm distortion of the bellows joint.

In accordance with one embodiment of the invention, an expansion joint comprised of at least four discrete bellows groups interconnects a pair of pipe sections. Each bellows group is connected to an adjacent bellows group by a ring. End rings are each fixed to a pipe end and support fixed cylindrical inner liners which have axially inward free ends whereas a floating center ring supports a cylindrical center liner having opposite free ends. The cylindrical inner liners all have radially outward limit stops and the rings have radially inward stops which coact with liner limit stops to limit the extension and compression of each bellows group. Lateral deflection of the bellows groups is limited by small radial clearances between the inner liners and bellows groups.

The novel features believed characteristic of the present invention are set forth in the appended claims. The invention, itself, however, together with further objects and advantages thereof, may best be understood with reference to the following description, taken in connection with the appended drawing, in which:

FIG. 3 is an elevation cross section of an expansion joint according to a preferred embodiment of the present invention interconnecting a pair of pipe sections.

DETAILED DESCRIPTION OF THE INVENTION

Figure 1:
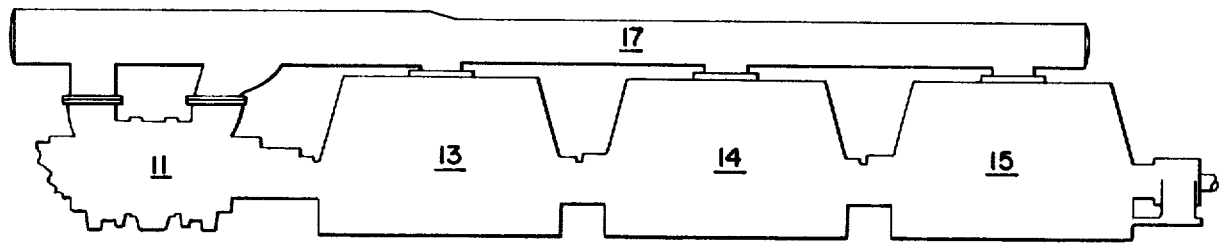
FIG. 1 is an elevation view of a plural casing turbine illustrating one environment in which the present invention may be utilized.
Figure 2:
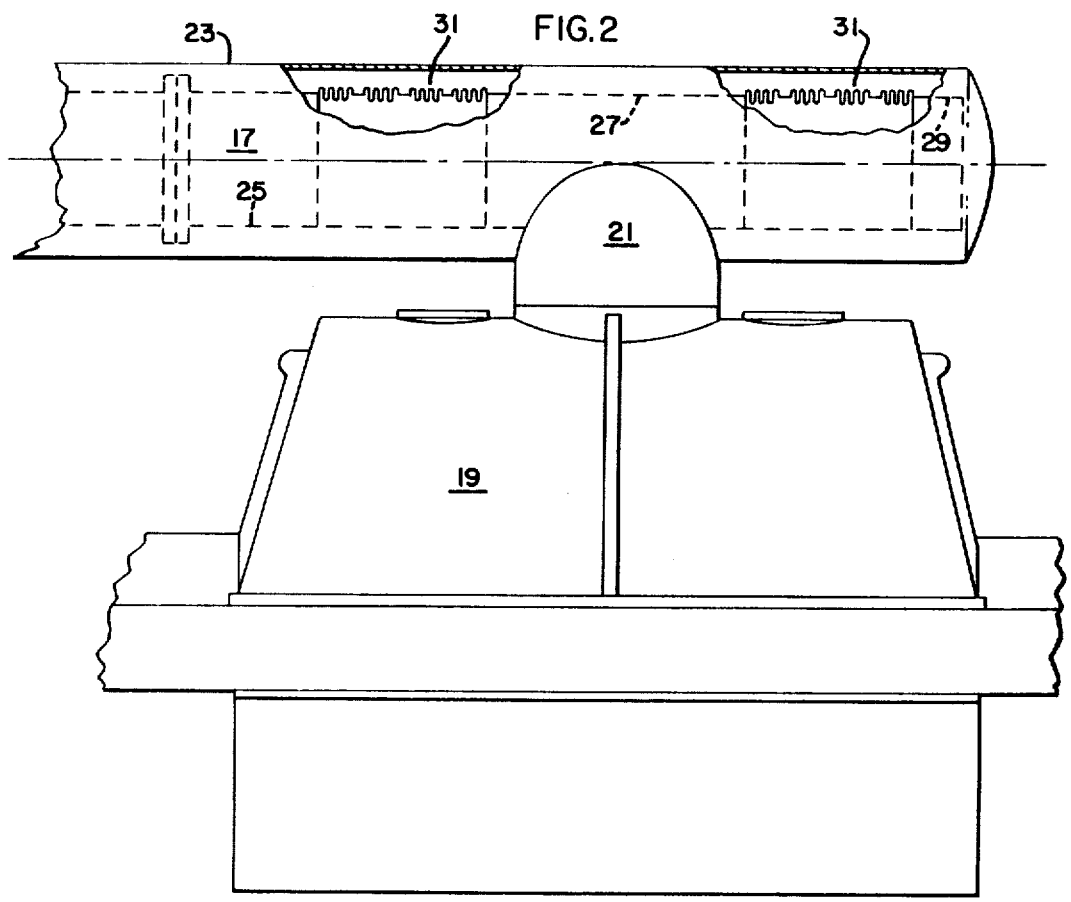
FIG. 2 is a partially cutaway view of a low pressure turbine casing and crossover pipe illustrating an application of the present invention.

Referring to FIGS. 1 and 2, one environment in which the present invention may be practiced is in a plural-casing steam turbine arrangement. FIG. 1 shows the outline of a double reheat, six-flow turbine including reheat or intermediate pressure turbine 11 and plural low pressure turbines 13, 14 and 15. Steam is delivered from the reheat turbine to the low pressure turbines by means of a crossover pipe 17.

FIG. 2 shows an enlarged elevation view of one such low pressure turbine including an outer casing 19. The low pressure turbine is interconnected with the crossover pipe through turbine inlet pipe 21. The crossover pipe includes an outer wrapper pipe 23 and inner pipe sections 25, 27 and 29. Inner pipe section 27 is a formed "T" section, the radial portion bolted to the low pressure turbine casing. The axial portion of the "T" section 27 is permitted to "float" between fixed pipe sections 25 and 29 by means of expansion joints 31 so as not to stress the fluid connection between the crossover pipe and turbine casing. A further description of the use of expansion joints is given in U.S. Pat. No. 3,488,949 to Jackson, issued Jan. 13, 1970, and assigned to the assignee of the present invention.

FIG. 3 shows one expansion joint interconnecting a pair of pipe sections. An end ring 33 is attached to each end of a pipe section and each end ring extends axially toward the other end ring and a center ring 35. An intermediate ring 37 is positioned between each end ring and the center ring. The end rings are connected to the intermediate rings by a pair of axially outer bellows 39 whereas the center ring and the intermediate rings are connected by a pair of axially inner bellows 41. It is thus apparent that the center ring 35 and intermediate rings 37 are free to shift axially whereas end rings 33 are fixed to the pipe section.

A pair of rigid, cylindrical end ring liners 42 are each attached to a respective end ring. Noting the direction of flow indicated in FIG. 3, the end ring liner attached to the upstream end ring extends downstream terminating in a free end. The end ring liner attached to the downstream end ring extends upstream and also terminates in a free end.

A rigid cylindrical center ring liner 43 is attached to the center ring, at a point intermediate the ends of the center ring liner, and terminating in both upstream and downstream free ends.

The free ends of each end ring liner includes a radially outward circumferential lip 45 defining an axially outer stop limit. The free ends of the center ring liner each include a radially outward circumferential lip 47 defining an axially inner stop limit. It should be noted that the axially outer stop limits are fixed whereas the axially inner stop limits may shift axially along with the center ring, intermediate rings and center ring liner.

Each intermediate ring is formed with a radially inward depending circular flange 49 axially positioned midway between a pair of radially inward depending circular end flanges 51. The flanges 49 and 51 extend radially inward to coact with limit stops 45 and 47. The flange 49 depends radially inward between limit stops 45 and 47 and the flanges 51 on either side of limit stops 45 and 47.

In general, relative motion of the two rings 33 will induce axial forces throughout the joint of approximately equal magnitude, modified by frictional resistance between liners and rings. Therefore at full extension stop limits 45 and 47 will be in contact with adjacent flanges 51 simultaneously and at full compression with flange 49. The extension and compression range of each discrete group is limited by the stops and cannot be exceeded by a force unbalance caused by frictional resistance.

Lateral deflection and "squirm" is controlled by close radial clearances between radially outward limit stops 45 and 47 which contact intermediate rings 37 to inhibit more than a limited amount of lateral deflection.

A cylindrical deflector 55 is attached to the free end of upstream end ring liner 42 and extends downstream to axially overlap the upstream end of the center ring liner thereby providing means to prevent radial steam leakage between the free end of the upstream end ring liner and the upstream free end of the center ring liner. The same function is accomplished downstream by a second cylindrical deflector 57 attached at one end to the downstream free end of the center ring liner and axially overlapping the free end of the downstream end ring liner.

The operation of the present invention may be described in the following manner. Each individual bellows 39/41 includes a plurality, and preferably at least four convolutions, well within present design limits for a single "unsupported" bellows having no special deflection or squirm control. However, this means that the entire expansion joint will include at least 16 convolutions.

Axial expansion and contraction of the outer bellows is controlled by outer limit stops 45. Axial expansion and contraction of the inner bellows is controlled by inner stops 47. Unequal deflection within the expansion joint is prevented by floating intermediate rings 37, center ring 35 and center ring liner 43 which may move axially to allow further thermal expansions to adjacent rings as each limit stop is reached, hence averting unequal deflection in any one bellows.

"Squirm" within the expansion joint is prevented because of the close radial clearance between each stop limit formed on each rigid cylindrical liner and the closely adjacent rings.

While there has been shown what is considered to be the preferred embodiment of the invention, it is, of course, understood that other modifications may be made therein. Such modifications may include the use of two or more center rings. It is intended to cover all such modifications as fall within the true spirit and scope of the disclosed invention.

What is claimed is:

1. A bellows expansion joint for connecting a pair of pipe sections comprising:
   a pair of end rings, one at the end of each pipe section;
   a center ring axially positioned between the end rings;
   a pair of intermediate rings, one between the center ring and each end ring;
   a pair of axially outer bellows, one connecting each end ring with an adjacent intermediate ring;
   a pair of axially inner bellows, one connecting each intermediate ring with the center ring;
   a pair of end ring liners, each attached at one end to its respective end ring and having the other end free and directed toward the center ring; each free end terminating in a radially outward circumferential lip defining a pair of axially outer limit stops;
   a center ring liner, attached at a point between its ends to the center ring and having oppositely directed free ends, each free end terminating in a radially outward circumferential lip defining a pair of axially inner limit stops; and,
   stop means depending radially inward from each intermediate ring and cooperating with the outer and inner limit stops for limiting the axial deflection of each bellows.

2. The bellows expansion joint recited in claim 1 wherein the stop means includes a flange formed on each intermediate ring which depends radially inward between a respective outer and inner limit stop.

3. The bellows expansion joint recited in claim 1 wherein the stop means includes a flange formed at each end of an intermediate ring which depends radially inwardly to overlap radially a respective inner and outer limit stop.

4. The bellows expansion joint recited in claim 1 wherein the stop means include:
   a flange formed on each intermediate ring equidistant from its ends and depending radially inward between a respective outer and inner limit stop; and,
   a flange formed at each end of an intermediate ring which depends radially inwardly to overlap radially the respective inner and outer limit stop.

5. The bellows expansion joint recited in claim 1 further including means for preventing steam leakage radially between the center liner and each end liner comprising:
   a first cylinder attached to the free end of the upstream end liner and extending downstream beyond the upstream free end of the center liner; and,
   a second cylinder attached to the downstream free end of the center liner and extending downstream beyond the free end of the downstream end liner, the first and second cylinders axially overlapping a portion of the center liner and downstream end liner respectively.

6. The bellows expansion joint recited in claim 1 wherein close radial clearances between the limit stops and respective intermediate rings allow only limited radial deflection.

7. The bellows expansion joint recited in claim 1 wherein each bellows has at least four convolutions and the entire expansion joint has at least sixteen convolutions.

8. The bellows expansion joint recited in claim 1 wherein the end rings are fixed and the center ring and intermediate rings are floating.

9. The bellows expansion joint recited in claim 1 wherein the end ring liners are fixed and the center ring liner floats therebetween.

* * * * *